Dec. 28, 1965     A. SCHURE     3,225,457
DEVICE FOR SELECTIVELY EXPOSING AND CONCEALING STIMULI
Filed June 12, 1963     2 Sheets-Sheet 1

INVENTOR:
ALEXANDER SCHURE
BY
ATTORNEYS

Dec. 28, 1965 A. SCHURE 3,225,457
DEVICE FOR SELECTIVELY EXPOSING AND CONCEALING STIMULI
Filed June 12, 1963 2 Sheets-Sheet 2
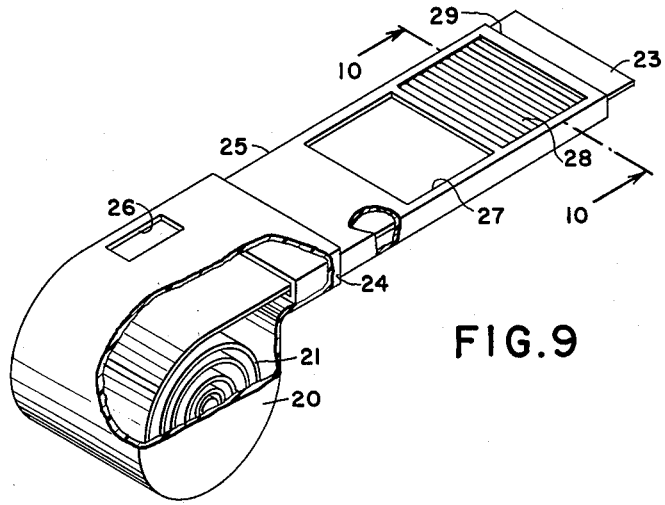
FIG.9
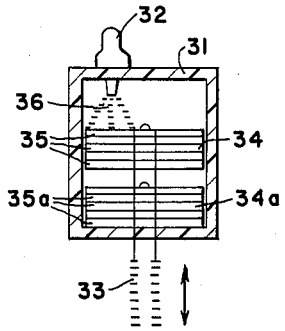
FIG.8
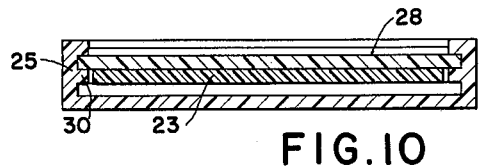
FIG.10
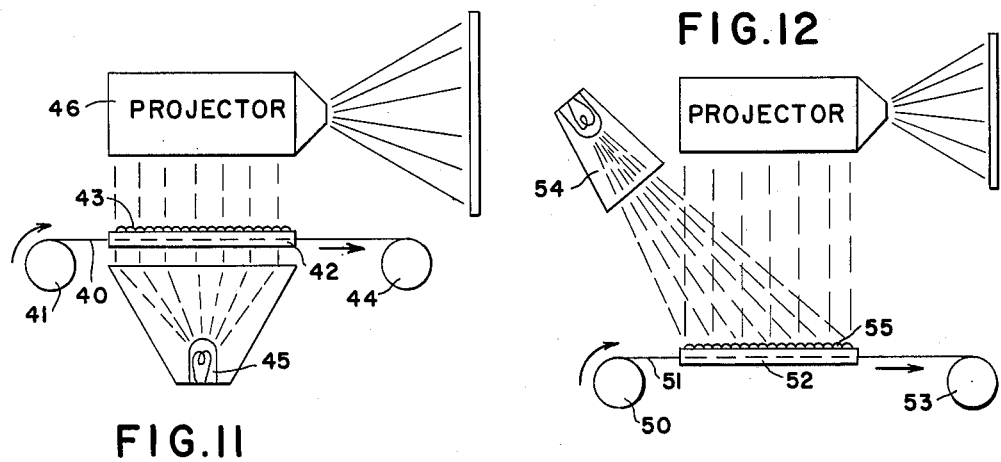
FIG.12
FIG.11
INVENTOR:
ALEXANDER SCHURE
BY
ATTORNEYS

United States Patent Office 3,225,457
Patented Dec. 28, 1965

3,225,457
DEVICE FOR SELECTIVELY EXPOSING AND CONCEALING STIMULI
Alexander Schure, 274 Beach 141st St., Belle Harbor, N.Y.
Filed June 12, 1963, Ser. No. 287,273
7 Claims. (Cl. 35—9)

This invention relates to a teaching device of simple construction and, in particular, to a device characterized by a viewing screen capable of unscrambling stimuli which appear optically confused and indistinguishable to the eye thereby to render at least one of said stimuli intelligible. The invention also relates to a means for effecting animation by exposing and concealing separate stimuli portions whereby to effect linear movement of stimuli.

The pressing need for improving the efficiency of educational processes has led to the introduction of teaching devices having as their function to increase the teacher's control over learning activities within the class room and to improve the students' learning efficiency outside the class room. Such devices are designed with the function of presenting information in a carefully planned sequence in the form of frames of stimuli of selected educational content on a carrier sheet and of revealing the stimuli through a stationary window or cut-out, the size of the frames of stimuli generally conforming to the size of the window.

Devices of this type usually provide a means by which the students are enabled to indicate their response to stimuli relating to the material presented and then immediately thereafter check the correctness of their response. In this way, students can check their progress as they proceed. I disclose a teaching device of this general type in my U.S. Patent No. 3,046,675 (granted July 31, 1962), which device is somewhat structurally simple, inexpensive and amenable to mass production techniques from such materials as paper, plastic, cardboard or other inexpensive materials of construction.

The trend continues towards more simple devices, particularly devices having a greater versatility of use in the presentation of stimuli unrestricted by the size of the window or observation station. I disclose such a device in my copending application Serial No. 242,433, filed Dec. 5, 1962, now U.S. Patent No. 3,174,231. In that device, I provide a matrix adapted to receive and expose consecutive frames of stimuli arranged as programmed material on a sheet. The matrix has a first observation station associated therewith comprising a window cut-out of predetermined size corresponding to a given unit size of a frame of stimuli exposable through said window. A second observation station is provided below the first station comprising a color filter of predetermined size adapted to conceal normal stimuli printing whose color is substantially compatible with that of the filter, whereby the filter conceals the colored stimuli from view until the stimuli reach the window cut-out for viewing. In using the device, a question to a problem is first revealed in the window cut-out with a space provided for an answer by a student. The answer to the problem is printed in color below the question and is concealed from view by the color filter. After the student has recorded his answer the program sheet is fed through the matrix until the concealed answer reaches and is exposed at the window cut-out from which the student then derives reinforcement with regard to his previously recorded answer.

It would be desirable to have a device in which the critical stimuli on the program sheet are unintelligible and appear optically confused under normal circumstances but which are rendered intelligible only when viewed through a window characterized by means thereon which will render the stimuli intelligible to an observer. Such a device would be advantageous in that it would be compromise proof to the extent that one having access to the program sheet prior to insertion in the device could not possibly obtain an answer to the problem without first inserting the program sheet into the device and carrying out the required manipulations.

It would also be desirable to have a simple device capable of illustrating a principle pictorially as part of programmed learning, such as the inner working of an internal combustion engine, the flow of blood in a vein, the flow of current in an electrical circuit, etc.

It is therefore an object to provide a teaching device of simple construction having an observation station or stations, at least a portion of said observation station having a window of transparent material capable of unscrambling optically confused stimuli and rendering them intelligible.

Another object is to provide a viewing matrix and a program sheet therefor, wherein a window portion of the matrix cooperably associated with scrambled stimuli on the program sheet is capable of unscrambling said stimuli and rendering them intelligible.

A further object is to provide in combination a viewing matrix and a program sheet, wherein the viewing portion of the matrix comprises a lenticular screen having a plurality of lens faces cooperatively related to the program sheet, said screen being adapted to reveal selectively intelligible stimuli or branching data, i.e., alternate information paths, either directly or by referral, or being adapted by means of animation to illustrate scientific and other principles.

These and other objects will more clearly appear when taken in conjunction with the disclosure and the accompanying drawing, wherein:

FIG. 8 is a representation of a piston in two relative positions in a cylinder;

FIG. 9 depicts another embodiment of my device when used in combination with means for holding a program sheet for feeding through a matrix;

FIG. 10 is a cross-section of the device of FIG. 9 taken along line 10—10; and

FIGS. 11 and 12 show two embodiments depicting the use of a lenticular screen in optical combination with a projection device in the production of animated effects.

Broadly speaking, one embodiment of my invention comprises matrix means adapted to expose consecutive frames of stimuli arranged as programmed material on a sheet. In a preferred embodiment, at least a portion of the stimuli is optically scrambled and unintelligible. In carrying out the invention, I provide a first observation station associated with the matrix comprising a window cut-out of predetermined size corresponding to a given unit size of a frame of stimuli and adapted to expose the same, and a second observation station consecutively arranged with respect to the first station comprising a window of substantially transparent material having means associated therewith for unscrambling optically confused stimuli or for rendering stimuli intelligible.

Figure 1:
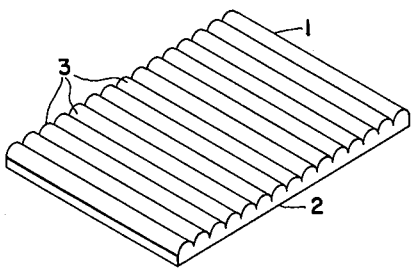
FIG. 1 shows a lenticular screen which may be adapted for use with an observation station of a teaching device.

As illustrative of a preferred type of window material that may be employed in unscrambling stimuli, reference is made to FIG. 1 which shows a lenticular screen 1 of transparent lens material having a smooth bottom face 2 and a top face characterized by a plurality of cylindrical segments contiguously arranged as lens elements 3. The lens elements run across the screen in parallel alignment and appear in cross section to define a plurality of interconnecting cylindrically curved faces 4 (note FIG. 4) each face of which constitutes a line of the screen. Such a screen enables the viewing of an image on a sheet along various angles of view, depending on the viewing position of the observer, or depending on the relative movement between the surface containing the stimuli and the screen. The transparent material from which the screen is made may comprise any lens material, such as glass or transparent plastic, for example cellulose acetate, or the like.

Assuming, as stated above, that each lens element constitutes a line of the lenticular screen and there are 50 lines (or elements) on the screen per unit length of screen, it would be possible to arrange two sets of stimuli on a program sheet related to the 50 lines of the screen in such a manner that to the eye, under normal viewing, they appear to be scrambled. This may be accomplished by imprinting one set of stimuli on the program sheet by independently positioning each line thereof within 50 alternate lines on the sheet and similarly with the other set of stimuli on the remaining 50 alternate lines of the sheet, there being a total of 100 lines of stimuli per unit length of screen. In other words, two alternate lines of stimuli appear directly under each lens element. For example, the set of stimuli making up one image would be selectively viewable as a whole through the screen, depending on the angle or line of vision.

Figure 2:
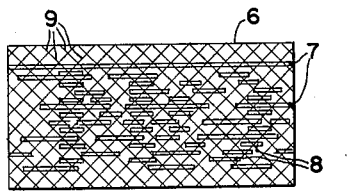
FIGS. 2 and 3 are illustrative of an arrangement of optically confused stimuli showing how one of the stimuli (note FIG. 3), can be revealed in preference to the other by means of a lenticular screen or window.

The foregoing will be understood from the simple representation of stimuli shown in FIG. 2 which is a sheet 6 containing alternate rows of sets of stimuli comprising solid lines 7 separated by alternate rows of solid dashes 8. The rows are arranged in relation to corresponding lines or lens elements of the lenticular screen as depicted in FIG. 3 and in the enlarged cross-sectional side view of FIG. 4 taken along line 4—4 of FIG. 3.

Figure 3:
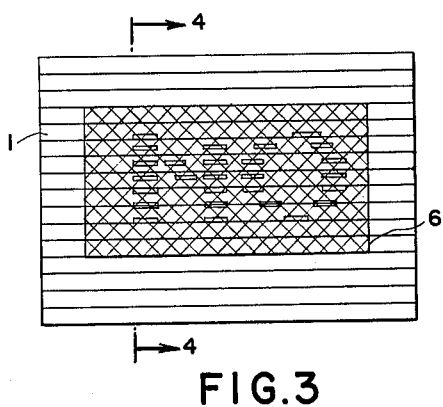

Referring to FIG. 3, lenticular screen 1 is shown in position over sheet 6 containing alternate rows of stimuli. Sheet 6 also contains finely imprinted cross hatched lines to render the imprinted stimuli more optically confused. The screen has been selectively positioned so that solid lines 7 have been blocked out of view, leaving solid dashes 8 which spell out the word "NO." The manner in which this is accomplished will be apparent from FIG. 4 which shows pairs of stimuli portions 7 and 8 under each of cylindrically curved faces 4.

Figures 4, 5:
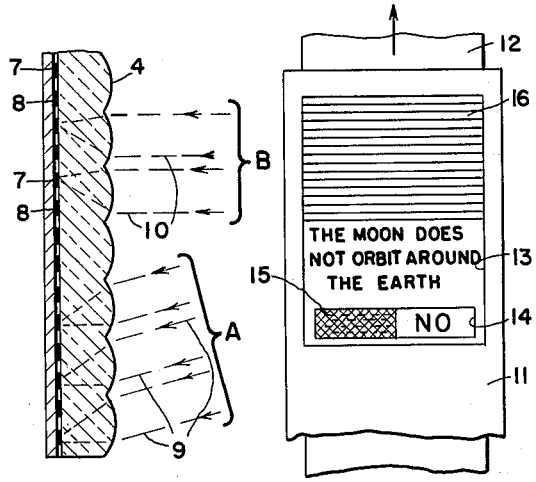
FIG. 4 depicts in cross section a portion of a lenticular screen showing the relation of the lenses to the stimuli directly beneath the lens.
FIG. 5 is a fragmentary view of a matrix and program sheet combination illustrating one embodiment of my invention.

By sighting the arrangement shown in FIG. 4 from the viewing position A, it will be noted that the lines of sight 9 are directed to faces 4 of the screen at an angle such that they are refracted towards stimuli 8 so that in effect the solid lines are blocked out and all that the eye sees are dashes which combine to form a coherent image of the word "NO." If the viewing position were taken from B, then the lines of sight 10 would strike the cylindrical faces at such an angle that only solid lines 7 are seen merely as a group of parallel lines.

One embodiment of my teaching device utilizing the inventive concept is shown fragmentarily in FIG. 5 as comprising a matrix 11 made of fairly stiff composition paper, or other suitable material, of substantially flat configuration in the nature of a flat tube sheet having a rectangular opening running longitudinally therethrough containing a program sheet 12 carrying stimuli thereon. The matrix has a rectangular window or cut-out 13 on the top surface thereof of a predetermined size to expose a frame of stimuli as shown in the form of a statement, to wit, "The Moon Does Not Orbit Around the Earth." In the space 14 alloted below the problem, the student inserts a "yes" or "no" answer. To the left of this space, a concealed answer 15 is camouflaged. Above the cut-out, a transparent lenticular screen 16 is provided of the type shown in FIGS. 1 and 4 beneath which the program sheet is moved to unscrambled the correct answer 15 and thereby reinforce the student. In this instance, the correct answer is "NO." It will be apparent from the foregoing that I provide a construction which, because of its simplicity, lends itself in a variety of ways as an element in teaching devices.

Figure 6:
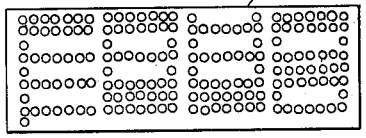
FIGS. 6 and 7 illustrate another embodiment of concealing and exposing stimuli.
Figure 7:
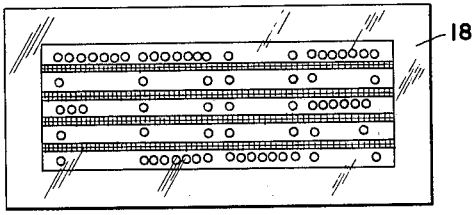

Another window embodiment which may be employed is that shown in FIG. 7 when used in conjunction with the scrambled stimuli of FIG. 6. In this embodiment, the overlay window may comprise any transparent material having means thereon adapted to selectively block out the optically confusing portions of stimuli thereby to render the stimuli intelligible. For example, such an overlay may comprise a transparent window 18 having block-out lines arranged thereon in a certain desired sequence. For illustrative purposes, let us assume the problem to be as follows:

———— score and seven years
ago, our forefathers
brought forth on . . .

The answer, of course, is "Four." After the student has determined his answer, he reinforces it by unscrambling the answer shown in FIG. 6 on sheet portion 19 by moving the portion of the sheet containing the scrambled answer beneath and in indexing relationship with window 18 which then reveals the correct answer "Four" as shown in FIG. 7.

Referring to FIG. 9, I show partially broken away a cartridge-type container 20 of substantially cylindrical configuration adapted to hold a scroll 21 of program sheet material 23. A mouth portion 24 communicates substantially tangentially with the cylindrical portion through which the programmed sheet is fed.

In this embodiment, I show the cartridge in telescopic cooperation via the mouth portion with matrix 25. An aperture 26 is provided on the cartridge to enable one to start the feeding of the programmed sheet until it reaches cut-out 27 and passes under lenticular screen 28 and out through end 29 of the matrix. As stated hereinabove, the lenticular screen is adapted to unscramble stimuli and make it intelligible to the student.

The lenticular screen may be movable in one direction to a limited extent within the matrix housing to aid in unscrambling the stimuli. Such a construction may compries that shown in FIG. 10 which is a cross-section taken along line 10—10 of FIG. 9. The matrix 25 is shown having a pair of inwardly projecting shoulders 30 on each side thereof defining a pair of marginal spaces for slidably receiving the edges of lenticular screen 28, the program sheet 23 being shown lying just beneath the screen, the lenticular screen being only movable to a limited extent near the upper portion of the matrix.

When pictorial representations are employed as part of the programmed material, I find that my device is particularly adapted for presenting such representations in animated form. In simulating the movement of a mechanical element, a plurality of images of the element are produced on the program sheet formed of lines which correspond in rulings to the lenticular viewing screen. Assuming the movement of a piston of an internal combustion engine is shown by printing a double image, the second image would be displaced from the first image in a direction at right angles to the lineations forming the piston. Each of the lineations of the second image would be related to one portion of each of the cylindrical faces of the lenticular screen, while each of the lineations of the first image would be related to another portion of each of the cylindrical faces of the lenticular screen.

Referring to FIG. 8, I show a simplified drawing of a piston and cylinder combination of an internal combustion engine comprising a cylinder 31, a spark plug 32, a piston rod 33 and a double image of a piston comprising a first piston image 34 and a second piston image 34a. The piston is shown formed of lineations 35 and 35a which correspond to the parallel cylindrical faces of the lenticular screen except that lineations 35 are displaced slightly relative to one portion of each of the cylindrical faces as compared to lineations 35a which are displaced differently such that for any one position of the program sheet or of the lenticular screen, one set of lineations 35 or 35a would be concealed from view. For example, as the program sheet is moved in a linear direction at right angles to the lineations on the sheet and to the lens rulings on the lenticular screen, the piston will appear to move up and down. The spark 36 emanating from the spark plug would comprise discrete linear lines or dots which are blocked out or concealed from view when the piston is in the down position (34a) and come into view when the piston is in the up or compression position (34), thus giving the illusion of the spark going off and on. The portion of the piston rod extending from the cylinder may also comprise a series of discrete linear lines or dots so arranged relative to the lenticular screen that every alternate line or dot is sequentially blocked from view so as to give the illusion of up and down movement.

In producing the effect of animation, it will be appreciated that the speed with which the program sheet moves relative to the lenticular screen is critical. The principle of persistence of vision holds here as it does in motion pictures (note page 80 of "Fundamentals of Optical Engineering" by Donald H. Jacobs, McGraw-Hill Book Company, Inc., 1943), except that in motion pictures a shutter is employed to achieve a dark interval between frames, while in the device of the invention, the dark interval between a display of stimuli results from the inherent characteristics of the lenticular lens. Putting it succinctly, animation will be achieved so long as the linear speed of the program material does not exceed the critical speed at which the effect of animation ceases. The desired speed is very easily determined by trial and error.

I find with my invention that the educational content of a program sheet, particularly educational content presented as animations, can be projected on a large viewing screen. One embodiment is shown in FIG. 11 in the case of a transparent program sheet having imprinted thereon illustrations in lineated form corresponding to the rulings of the lenticular screen. In FIG. 11, I show a continuous length of a transparent program sheet 40 being fed from reel 41 through an open matrix 42 having a lenticular screen 43 on the top surface thereof. The program sheet passes through the matrix to take-up reel 44 which is preferably motor driven (not shown) at a speed below the critical speed necessary to assure animation. A light source 45 is employed below the open matrix for passing light through the sheet and the lenticular lens to a conventional projecting unit 46 having a conventional system of lenses (not shown) for projecting the image on screen 47. I find such a simple arrangement vrey effective and more economical than the motion picture technique now being employed in class instruction.

Where the program sheet is opaque, projecting of the programmed material can be similarly effected by reflected light as shown in FIG. 12. There I show a playoff reel 50 from which program sheet 51 is fed through matrix 52 to takeup reel 53. A light source 54 is provided above the lenticular screen 55. Light is directed to the lenticular screen and reflected therefrom to projector 56 as in FIG. 11 and the image projected onto a screen (not shown).

It is apparent from the present description of my invention that the device has a wide variety of uses. It may be used for test purposes or may be used merely as a method of programmed teaching. For example, the stimuli may comprise material of an informational nature such as a word description on a particular subject, or pictorial representations, followed by questions which are answered by the student, immediately after which a correct answer is given to provide reinforcement for the student as a check of his progress. In combination with the informational and question and answer stimuli, "branching" stimuli may be provided in the form of referral data to direct the student to text books for further study. It is quite apparent that, despite the simplicity of my device, it is characterized by a versatility of use which lends itself to mass education at low cost.

In its more preferred aspect, the invention provides a teaching device comprising a matrix adapted to receive and expose consecutive frames of stimuli arranged as programmed material on a sheet, a programmed sheet containing stimuli associated with said matrix, said stimuli being imprinted by lineations within a predetermined group of lines, preferably with at least a portion thereof being optically confused, a first observation station associated with said matrix comprising a window cut-out of predetermined size corresponding to a given unit size of a frame of stimuli and adapted to expose the same, and a second observation station consecutively arranged with respect to said first station comprising a lenticular screen characterized by a plurality of contiguously arranged cylindrical faces in parallel alignment corresponding to said group of predetermined lines on the program sheet and adapted selectively to unscramble said optically confused stimuli, or by movement of the sheet relative to the lens to effect animation of said stimuli. Preferably, the cylindrical faces on the screen are arranged in parallel across the lenticular screen. By optically confused stimuli is meant stimuli which normally are difficult to read or stimuli which are capable of being rendered intelligible through animation.

While the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A teaching device comprising a matrix adapted to receive and expose consecutive frames of stimuli arranged as programmed material on a sheet, a program sheet containing stimuli associated with said matrix, at least a portion of said stimuli being optically confused and composed of sets of lineations, each set comprising alternate lines of bits of stimuli, a first observation station associated with said matrix comprising a window cut-out of predetermined size corresponding to a given unit size of a frame of stimuli and adapted to expose the same, and a second observation station consecutively arranged with respect to said first station comprising a lenticular screen of predetermined size characterized by a plurality of lens elements formed of contiguously arranged cylindrical segments for rendering said optically confused stimuli intelligible.

2. A teaching device comprising a matrix adapted to receive and expose consecutive frames of stimuli arranged as programmed material on a sheet, a program sheet containing stimuli associated with said matrix, at least a portion of said stimuli being optically confused and composed of sets of uniformly spaced lineations; each set comprising alternate lines of bits of stimuli, a first observation station associated with said matrix comprising a window cut-out of predetermined size corresponding to a given unit size of a frame of stimuli and adapted to expose the same, and a second observation station consecutively arranged with respect to said first station comprising a lenticular screen of predetermined size characterized by a plurality of lens elements formed of contiguously arranged cylindrical segments in parallel alignment, said lens elements corresponding to and being uniformly spaced in accordance with each set of lines on the program sheet whereby to render said optically confused stimuli intelligible.

3. A teaching device comprising a matrix adapted to receive and expose consecutive frame of stimuli arranged as programmed material on a sheet, a program sheet containing stimuli associated with said matrix, at least a portion of said stimuli being optically confused and composed of sets of uniformly spaced lineations, each set comprising alternate lines of bits of stimuli, a first observation station associated with said matrix comprising a window cut-out of predetermined size corresponding to a given unit size of a frame of stimuli and adapted to expose the same, a second observation station consecutively arranged with respect to said first station comprising a lenticular screen window of predetermined size characterized by a plurality of lens elements formed of contiguously arranged cylindrical segments in parallel alignment, said lens elements corresponding to and being uniformly spaced in accordance with each set of lines on the program sheet whereby to render said optically confused stimuli intelligible, and means associated with said device containing additional lengths of said program sheet, the stimuli on said program sheet being presented in prearranged order depending on the correlation desired between intelligible stimuli exposed at the cut-out and the optically confused stimuli adapted to be viewable through said lenticular screen and rendered intelligible.

4. The device of claim 3 wherein the optically confused stimuli contained in pre-arranged order on the program sheet include branching stimuli.

5. A teaching device comprising a matrix adapted to receive and expose consecutive frames of stimuli arranged as programmed material on a sheet, a program sheet containing stimuli associated with said matrix, at least a portion of said stimuli being optically confused and arranged for animation, said portion being composed of sets of uniformly spaced lineations, each set comprising alternate lines of bits of stimuli in selected animating positions, an observation station associated with said device comprising a lenticular screen of predetermined size characterized by a plurality of lens elements formed of contiguously arranged cylindrical segments in parallel alignment, said lens element corresponding to and being uniformly spaced in accordance with each set of lines on the program sheet whereby to render said optically confused stimuli intelligible and effect animation of the same when the program sheet is moved relative to the lenticular screen.

6. A teaching device comprising a matrix adapted to receive and expose consecutive frames of stimuli arranged as programmed material on a sheet, a program sheet containing stimuli assoicated with said matrix, at least a portion of said stimuli being optically confused and arranged for animation when viewed through a lenticular screen, said portion being composed of sets of uniformly spaced lineations, each set comprising alternate lines of bits of stimuli in selected animating positions, a first observation station associated with said matrix comprising a window cut-out of predetermined size corresponding to a given unit size of a frame of stimuli and adapted to expose the same, and a second observation station consecutively arranged with respect to said first station comprising a lenticular screen of predetermined size characterized by a plurality of lens elements formed of contiguously arranged cylindrical segments in parallel alignment, said lens elements corresponding to and being uniformly spaced in accordance with each set of lines on the program sheet whereby to render said optically confused stimuli intelligible and effect animation of the same when the program sheet is moved relative to the lenticular screen.

7. A teaching device comprising means for supporting stimuli arranged on a continuous program sheet, a program sheet containing stimuli associated with said device with at least a portion of said stimuli optically confused and arranged for animation when viewed through a lenticular screen, said portion being composed of sets of uniformly spaced lineations, each set comprising alternate lines of bits of stimuli in selected animating positions, means for receiving said program sheet from said supporting means along a path of feed, a matrix in said path of feed through which said program sheet is fed, a window on said matrix comprising a lenticular screen characterized by a plurality of lens elements formed of contiguously arranged cylindrical segments in parallel alignment, said lens elements corresponding to and being uniformly spaced in accordance with each set of lines on the program sheet, means for directing light from said lenticular screen to a projection unit and screen means for receiving the projection from said projection unit.

References Cited by the Examiner
UNITED STATES PATENTS

| | | | |
|---|---|---|---|
| 1,673,659 | 6/1928 | Anderson | 35—9 |
| 1,984,004 | 12/1934 | Wildhaber | 88—1 |
| 2,169,266 | 8/1939 | Matter | 35—9 |
| 2,178,906 | 11/1939 | Haumerson | 35—9 |
| 2,514,814 | 7/1950 | Towne | 88—1 |
| 2,896,085 | 7/1959 | Hagopian | 35—9 |
| 3,055,117 | 9/1962 | Bernstein | 35—9 |
| 3,139,689 | 7/1964 | Quintel et al. | 35—9 |

FOREIGN PATENTS 638,359  3/1962  Canada.

EUGENE R. CAPOZIO, *Primary Examiner.*

LAWRENCE CHARLES, JEROME SCHNALL,
*Examiners.*